L. L. BROWN & C. H. PATEK.
DAMPER.
APPLICATION FILED MAR. 19, 1913.
1,140,871.
Patented May 25, 1915.
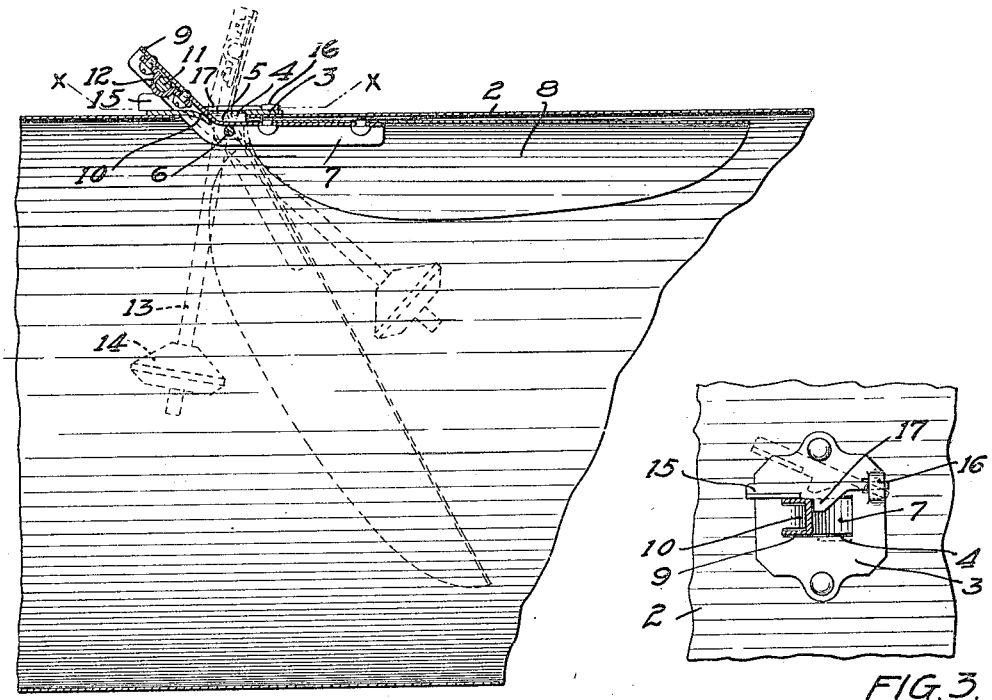
FIG. 1.
FIG. 3.
FIG. 2.
WITNESSES
INVENTORS
LEIGHTON L. BROWN
CHARLES H. PATEK
BY
ATTORNEYS
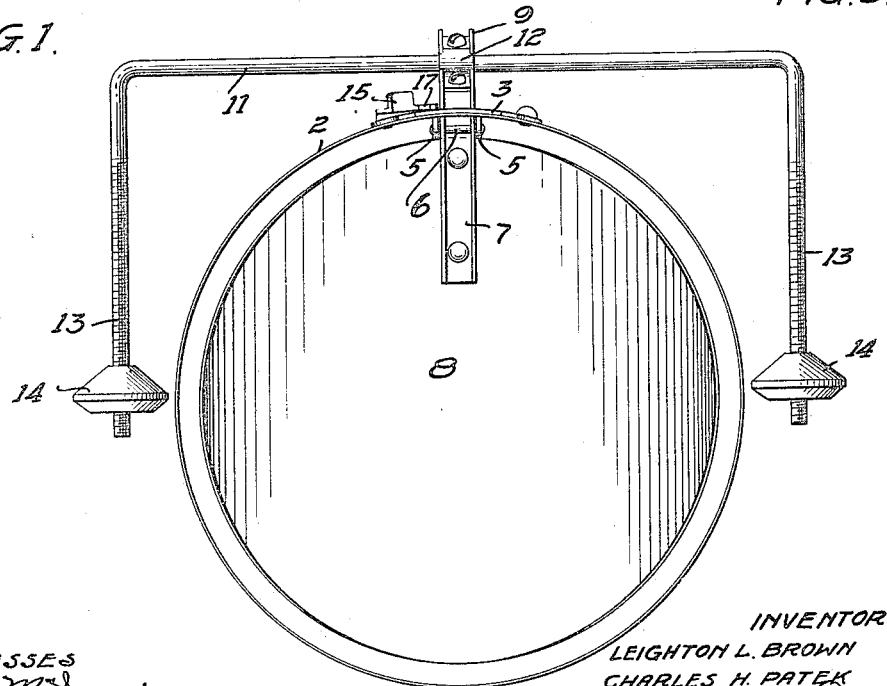
THE NORRIS PETERS CO., PHOTO-LITHO., WASHINGTON, D. C.

UNITED STATES PATENT OFFICE.

LEIGHTON L. BROWN, OF MINNEAPOLIS, AND CHARLES H. PATEK, OF BRAINERD, MINNESOTA, ASSIGNORS, BY DIRECT AND MESNE ASSIGNMENTS, OF FIVE-EIGHTHS TO SAID PATEK.

DAMPER.

1,140,871.  Specification of Letters Patent.  Patented May 25, 1915.

Application filed March 19, 1913. Serial No. 755,353.

*To all whom it may concern:*

Be it known that we, LEIGHTON L. BROWN and CHARLES H. PATEK, citizens of the United States, residents, respectively, of Minneapolis, Hennepin county, Minnesota, and Brainerd, Crow Wing county, Minnesota, have invented certain new and useful Improvements in Dampers, of which the following is a specification.

Our invention relates to dampers designed for controlling the currents of air in a flue and particularly adapted for use with the products of combustion flue of a heating stove or range.

The object of our invention is to provide a damper adapted particularly for use in a flue horizontally arranged or at an angle inclined to the horizontal.

A further object is to provide a damper having means for supporting the counter-balance weights which is capable of rotary adjustment to adapt the damper for freedom of movement in the varying angles of the flues in which the damper may be mounted.

Our invention consists generally in various constructions and combinations, all as hereinafter described and particularly pointed out in the claims.

In the accompanying drawings forming part of this specification, Figure 1 is a longitudinal sectional view of a portion of a pipe or flue with our improved damper mounted therein, Fig. 2 is an end view of a flue, showing the manner of supporting the damper, Fig. 3 is a detail view on the section line x—x of Fig. 1 of a locking device by means of which the damper may be locked in its open position to allow for free passage of the currents of air, as when starting the fire in the stove.

In the drawing, 2 represents a section of pipe.

3 is a plate secured by rivets or other suitable means over an opening in the pipe the plate being provided with an opening 4 which registers with the pipe opening. Lugs or ears 5 are pressed inwardly over the plate 3 and a pivot pin 6 passes through these lugs into the pipe and is secured to the damper blade or disk 8. This blade is curved, preferably, in cross section to fit snugly against the inner wall of the pipe, as indicated in Fig. 1. The arm 7 is preferably in the form of a channel, for convenience of manufacture and strength, and has an outer end portion 9 bent at an angle to its inner portion and projecting through the opening 4, and a tongue 10 is preferably formed on the plate 3 and extends inwardly between the flanges of the arm 7.

Near the outer end of the angular portion 9 of the arm 7 we mount a yoke 11, preferably by fitting it into recesses in the flanges of said arm and securing it by means of a loop 12 which clamps the yoke with sufficient pressure to hold it in any position in which it may be adjusted, while allowing the yoke to be rotated to adapt it for the angle of the pipe or flue. The yoke has threaded ends 13 which are adapted to straddle the pipe and support counter-balance weights 14. The yoke is of sufficient length to allow the end portions 13 to extend down upon opposite sides of the pipe and permit the free rotation of the yoke, for the purpose of adjusting the weights according to the angle of the pipe in which the damper may be mounted.

For the purpose of locking the damper in its open position when it is desired to provide an uninterrupted flow of the air currents through the flue, as, for instance, in building a fire in the stove, we provide a latch 15 having a bent end that is loosely inserted beneath a loop 16 that is pressed or punched from the plate 3, the shoulder of the latch engaging the edge of the opening in the plate beneath the loop and being held thereby against accidental displacement while allowing the latch to be moved edgewise into and out of engagement with the arm 7. One edge of the latch has a lug 17 formed thereon which is adapted to be moved into the path of the arm, as indicated in Fig. 3, and lock it in the position shown in Fig. 1, with the damper blade held against the inner surface of the pipe. Upon moving the latch to the dotted line position shown in Fig. 3, the damper may swing down across the pipe until counter-balanced by the weights 14.

With this device we are able to mount the damper in a pipe or flue that is horizontal or inclined to the horizontal, adjusting the yoke 11 to compensate for the variation in the angle of the pipe and moving the weights 14 back and forth on the arms 13 until the desired degree of counter-balance is obtained.

The air currents through the smoke flue move from right to left and the tendency as the draft increases through the pipe, due to varying conditions such as a strong wind or a chimney having a particularly strong draft, will tend to swing the damper blade to a position straight across the pipe, the weights and the yoke being adjustable to counteract this tendency to a certain extent, but allowing the damper blade to swing sufficiently to cut down the draft to the desired degree. If there is a very weak draft, as when the fire is first lighted, then the damper blade may assume a substantially horizontal position in the pipe, as indicated by full lines. By means of the adjustable weights the attendant can very easily adjust the damper according to the conditions of the draft and the weighted arms depending upon each side of the pipe will provide for uniform movement and avoid all danger of binding or cramping of the blade in the pipe.

We prefer to provide a yoke with arms on each side of the pipe to balance the load and provide for uniform movement, but obviously the damper may be counter-balanced by a yoke with a single arm, if preferred, and in various other ways the details of construction herein shown and described may be modified without departing from our invention.

We claim as our invention:—

1. The combination, with a smoke flue having an opening in the wall thereof, of an arm pivotally supported within said opening, a damper blade secured to said arm within said flue, and a locking latch loosely mounted at one end on the wall of said flue and having a part adapted to swing into said opening and into the path of said arm for locking it and said damper blade.

2. The combination, with a smoke pipe having an opening in the wall thereof, of an arm pivotally supported within said opening and projecting within said pipe, a damper blade secured to the inner portion of said arm, a rod mounted on the outer portion of said arm and free to rotate thereon and normally held by frictional engagement against premature rotation, said rod extending transversely of said pipe and having end portions turned at right angles substantially to the middle portion of said rod and extending downwardly on opposite sides of said pipe, and weights adjustably mounted on said ends.

3. The combination, with a pipe having an opening in its wall, of an arm pivotally supported within said opening, a damper blade secured to the inner portion of said arm, the outer portion of said arm being at an angle to its inner portion, a rod extending transversely of said pipe and having its middle portion mounted on the outer portion of said arm and capable of rotary adjustment in its bearing on said arm, the ends of said rod being turned at right angles substantially to its middle portion and projecting in parallel relation to one another upon opposite sides of said pipe and adjacent thereto, weights carried by said arms, the rotary adjustment of said rod on said arm permitting said damper blade to be counterbalanced and normally hang at any desired angle within said pipe.

4. The combination, with a smoke flue having an opening in the wall thereof, of an arm pivotally supported within said opening, a damper blade secured to said arm within said flue, a plate mounted on said flue over said opening, through which plate said arm projects, said plate having a loop pressed therefrom and a locking latch loosely mounted at one end in said loop and adapted to swing in the path of said arm for locking it and said damper blade.

5. The combination, with a smoke flue having an opening in the wall thereof, of an arm pivotally supported within said opening, a damper blade secured to said arm within said flue, a rod having its middle portion mounted on the outer portion of said arm and extending transversely of said flue and having end portions on each side of said flue turned at an angle substantially to the middle portion of said rod and extending upon opposite sides of said flue transversely thereof, and counter-balance weights mounted on said ends and equi-distant substantially from the bearing of said rod on said arm.

In witness whereof, we have hereunto set our hands this 4th day of March, 1913.

LEIGHTON L. BROWN.
CHARLES H. PATEK.

Witnesses:
GENEVIEVE E. SORENSEN,
EDWARD A. PAUL.